United States Patent
Hugenroth

(10) Patent No.: US 8,061,112 B2
(45) Date of Patent: Nov. 22, 2011

(54) AGRICULTURAL WORKING MACHINE WITH GROUND SPEED CONTROL

(75) Inventor: Ludger Hugenroth, Ostbevern (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 439 days.

(21) Appl. No.: 12/018,598

(22) Filed: Jan. 23, 2008

(65) Prior Publication Data

US 2008/0172997 A1    Jul. 24, 2008

(30) Foreign Application Priority Data

Jan. 24, 2007  (DE) .................... 10 2007 004 576

(51) Int. Cl.
*A01D 41/127* (2006.01)
(52) U.S. Cl. .................................................. 56/10.2 G
(58) Field of Classification Search ............. 56/10.2 R, 56/10.2 C, 10.2 G, 10.2 H, 10.5, 11.1, 10.8, 56/13.5, 14.1–14.7, 16.4 R, 16.4 A, 16.5, 56/16.9, DIG. 15; 701/50; 460/6
See application file for complete search history.

(56) References Cited

U.S. PATENT DOCUMENTS

| | | | | |
|---|---|---|---|---|
| 3,073,099 A * | 1/1963 | Andersen | ............................ | 460/6 |
| 4,542,802 A * | 9/1985 | Garvey et al. | ................. | 180/306 |
| 4,614,305 A | 9/1986 | Fekete et al. | | |
| 5,488,817 A * | 2/1996 | Paquet et al. | .............. | 56/10.2 R |
| 5,795,221 A | 8/1998 | Diekhans | | |
| 5,947,818 A * | 9/1999 | Satzler | ............................. | 460/6 |
| 6,315,658 B1 | 11/2001 | Weber | | |
| 6,865,870 B2 * | 3/2005 | Heisey | ........................ | 56/10.2 G |
| 7,200,980 B2 * | 4/2007 | Kempf | ............................ | 56/11.4 |
| 2003/0010025 A1 * | 1/2003 | Evans | ............................. | 60/431 |
| 2005/0279070 A1 * | 12/2005 | Pirro et al. | ..................... | 56/14.6 |
| 2006/0123757 A1 * | 6/2006 | Baumgarten et al. | ...... | 56/10.2 R |
| 2008/0034720 A1 * | 2/2008 | Helfrich et al. | ............ | 56/10.2 R |

FOREIGN PATENT DOCUMENTS

| | | |
|---|---|---|
| DE | 35 05 887 | 9/1985 |
| DE | 195 24 752 | 1/1997 |
| EP | 1 051 898 | 11/2000 |

* cited by examiner

*Primary Examiner* — Thomas Will
*Assistant Examiner* — Joan Misa
(74) *Attorney, Agent, or Firm* — Michael J. Striker

(57) ABSTRACT

A agricultural working machine includes at least one device for picking up crop material and transferring it to at least one intake conveyor mechanism that feeds the crop material to at least one downstream working unit that processes the crop material, and at least one drive engine with an engine control unit, the drive engine driving the at least one intake conveyor mechanism and the at least one working unit. At maximum crop-material throughput, the engine speed of the agricultural working machine is reduced and the ground speed is increased, and therefore the associated agricultural working machine it is ensured that the agricultural harvesting machine is able to process high crop-material throughputs with a lower specific energy requirement.

26 Claims, 3 Drawing Sheets

AGRICULTURAL WORKING MACHINE WITH GROUND SPEED CONTROL

CROSS-REFERENCE TO A RELATED APPLICATION

The invention described and claimed hereinbelow is also described in German Patent Application DE 10 2007 004 576.1 filed on Jan. 24, 2007. This German Patent Application, whose subject matter is incorporated here by reference, provides the basis for a claim of priority of invention under 35 U.S.C. 119(a)-(d).

BACKGROUND OF THE INVENTION

The present invention relates to a method for operating an agricultural working machine, in particular a forage harvester.

Publication DE 35 05 887 makes known a method for regulating crop-material throughput that regulates the throughput performance of an agricultural working machine designed as a forage harvester by monitoring the rotational speed of the chopper drum. According to the method disclosed therein, the drive engine of the forage harvester is operated in the usual manner in an engine speed range in which the maximum engine output is available. The preselectable rotational speed of the chopper drum fluctuates depending on the crop-material throughput to be processed by the agricultural working machine and the available engine output.

When the rotational speed of the chopper drum falls below a preset minimum value, suitable regulating devices reduce the ground speed and, therefore, the quantity of newly picked-up crop material until the rotational speed of the chopper drum returns to a rotational speed range that is above the preset minimum value. In an analogous manner, the ground speed of the agricultural working machine is increased when the torque provided by the available engine power is above the torque required to operate the forage harvester. Threshold values are used in this case as well that induce a change in the ground speed of the forage harvester if they are exceeded or fallen below.

A similar method for regulating throughput on a forage harvester is described in EP 1 051 898. In this case, the drive engine is to be operated at a nearly constant engine speed, while the crop-material throughput to be processed by the agricultural working machine is regulated as a function of the torque that corresponds to the nearly constant engine output and is provided by the drive engine. This regulation is carried out such that the ground speed is adjusted—i.e., reduced, if overload occurs—or the rotational speed of the intake rollers is changed, i.e., reduced, if overload occurs. It is also provided that fuzzy logic is used for this purpose.

Both of these methods have the disadvantage that the drive engine is always operated in the range of high engine speeds, which result in a rapid acceleration of the crop material, since the gear ratios between the drive engine and the working units it drives are typically fixed. The crop material is therefore conveyed through the agricultural working machine at a high rate of speed. The greater the quantity is of crop material—i.e., the crop-material throughput—to be conveyed, the greater is the portion of power required to accelerate the crop material and overcome the friction—which is proportional to speed—of the crop material inside the agricultural working machine. Both of these effects greatly limit the possibilities for increasing the crop-material throughput and, due to the high engine speed, result in the need to operate the drive engine of the agricultural working machine in a range of increased fuel consumption.

SUMMARY OF THE INVENTION

The object of the present invention, therefore, is to avoid the disadvantages of the related art described above and, in particular, to provide a method and an agricultural working machine for carrying out the method, with which high crop-material throughputs may be realized with a lower specific energy requirement.

In keeping with these objects and with others which will become apparent hereinafter, resides, briefly stated, in a method for operating an agricultural working machine, comprising the steps of picking up crop material and transferring it by at least one device to at least one intake conveyor mechanism; feeding by the at least one intake conveyor mechanism the crop material to at least one downstream working unit that processes the crop material; driving the at least one conveyor mechanism and the at least one working unit by at least one drive engine with an engine control unit of an agricultural working machine; and at maximum crop-material throughput, reducing an engine speed of the agricultural working machine and increasing a ground speed.

Another feature of the present invention resides, briefly stated, in an agricultural working machine, comprising at least one device for picking up crop material and transferring it; at least one intake conveyor mechanism to which the picked crop material is transferred by the at least one device and which feeds the crop material; at least one downstream working unit to which the crop material is fed and which processes the crop material; at least one drive engine with an engine control unit, which said drive engine drives said at least one intake conveyor and said at least one working unit; at least one engine speed measuring device; at least one engine speed display device; a ground speed measuring device; a ground speed display unit; means for permitting the engine speed and ground speed to be changed so that the agricultural working machine processes a maximum crop material throughput by reducing the engine speed and simultaneously increasing the ground speed.

The inventive method for operating an agricultural working machine, in particular a forage harvester, that includes at least one device for picking up crop material and transferring it to at least one intake conveyor mechanism that feeds the crop material to at least one downstream working unit that processes the crop material—the agricultural working machine including at least one drive engine with an engine control unit, and the drive engine driving at least one working unit—is characterized by the fact that the agricultural working machine manages the maximum crop-material throughput at a reduced engine speed and a higher ground speed. In this manner it is ensured that the agricultural harvesting machine may process high crop-material throughputs with a lower specific energy requirement. This effect is attained in particular by the fact that the drive engine is operated at a lower engine output and with improved specific fuel consumption. At the same time, the lower engine speed results in the crop material being accelerated less rapidly, due to the reduced rotational speed of the working units. As a result, in particular, the energy required to accelerate the crop material decreases, which ultimately results in lower engine output to be provided by the drive engine.

In an advantageous embodiment of the present invention, the reduced engine speed defines a partial-load operating point the engine speed range of which is below the engine speed of the maximum motor output that defines the full-load operating point. The new, lower engine speed therefore also results in lower fuel consumption.

A particularly fuel-efficient realization of high crop-material throughput is attained when the reduced engine speed is approximately 10 to 15% below the engine speed of the maximum engine output. This fuel-efficient realization of high crop-material throughput is enhanced even further when the ground speed—which was increased at the partial-load operating point—lies in a range of 20 to 30% above the ground speed when the at least one drive engine is operated in the engine speed range of the maximum engine output that defines the full-load operating point.

A particularly advantageous embodiment of the present invention results when the inventive method includes the following steps:

a.) Ascertain the maximum crop-material throughput by operating the forage harvester in the engine speed range of maximum engine output b.) Increase the ground speed of the agricultural working machine and simultaneously reduce the engine speed c.) Repeat step b until the maximum crop-material throughput ascertained in step a is reached.

This structure of the inventive method has the advantage, in particular, that the energy-optimized operating point of the agricultural working machine is ascertained systematically and, therefore, rapidly.

The tasks required of the operator of the agricultural working machine are greatly reduced in an advantageous embodiment of the present invention when steps a.) through c.) of the inventive method are carried out automatically by a control and regulating unit.

The most significant fuel-saving effects result when the inventive method is used, in particular, with crop material that has high mass and/or density, and a large particle size, since high accelerations of crop material require a great deal of energy, due to the large masses to be accelerated. In addition, large particles result when the cut lengths are long. The large particles require less energy for the crop material to be fragmentized. The ratio of energy required for fragmentation to the portion of energy required for acceleration and rasping worsens, thereby increasing the specific energy requirement and, therefore, fuel consumption.

Given that the agricultural working machine includes at least one engine speed measurement and display unit, and given that means are provided that permit the engine speed and ground speed to be changed in such a manner that the agricultural working machine process a maximum crop-material throughput by reducing the engine speed and simultaneously increasing the ground speed, a device is provided that makes it possible to process high crop-material throughputs with a lower specific energy requirement. In analogy with the inventive method, this effect is attained in particular by the fact that the drive engine is operated at a lower engine output and with improved specific fuel consumption. At the same time, the lower engine speed—due to the reduced rotational speed of the working units—results in the crop material being accelerated less rapidly. As a result, in particular, the energy required to accelerate the crop material decreases, which ultimately results in the lower engine output to be provided by the drive engine.

In an advantageous embodiment of the present invention, the means for changing the engine speed and the ground speed are designed as control levers for adjusting the ground speed and engine speed of the drive engine, which are known per se and are actuatable by the operator of the agricultural working machine. In this manner, the inventive method may be realized using the control elements that are integrated in the agricultural working machine anyway.

In a further advantageous embodiment of the present invention, the agricultural working machine includes means for sensing the crop-material throughput and/or fuel consumption, and at least one control and regulating unit, which regulates the engine speed of the at least one drive engine and the ground speed of the agricultural working machine as a function of the crop-material throughput and/or fuel consumption signals that were generated. In this manner, the operator of the agricultural working machine is relieved of nearly all of the tasks required to implement the inventive method.

A particularly effective regulation of the agricultural working machine based on the inventive method is attained when the regulating criterium is limited to operating the agricultural working machine at maximum crop-material throughput.

A particularly efficient implementation of the regulating cycle based on the machine design is ensured when, in order to change the engine speed, the control and regulating unit is coupled with the engine control unit of the at least one drive engine and the control of the ground drive such that data may be exchanged.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
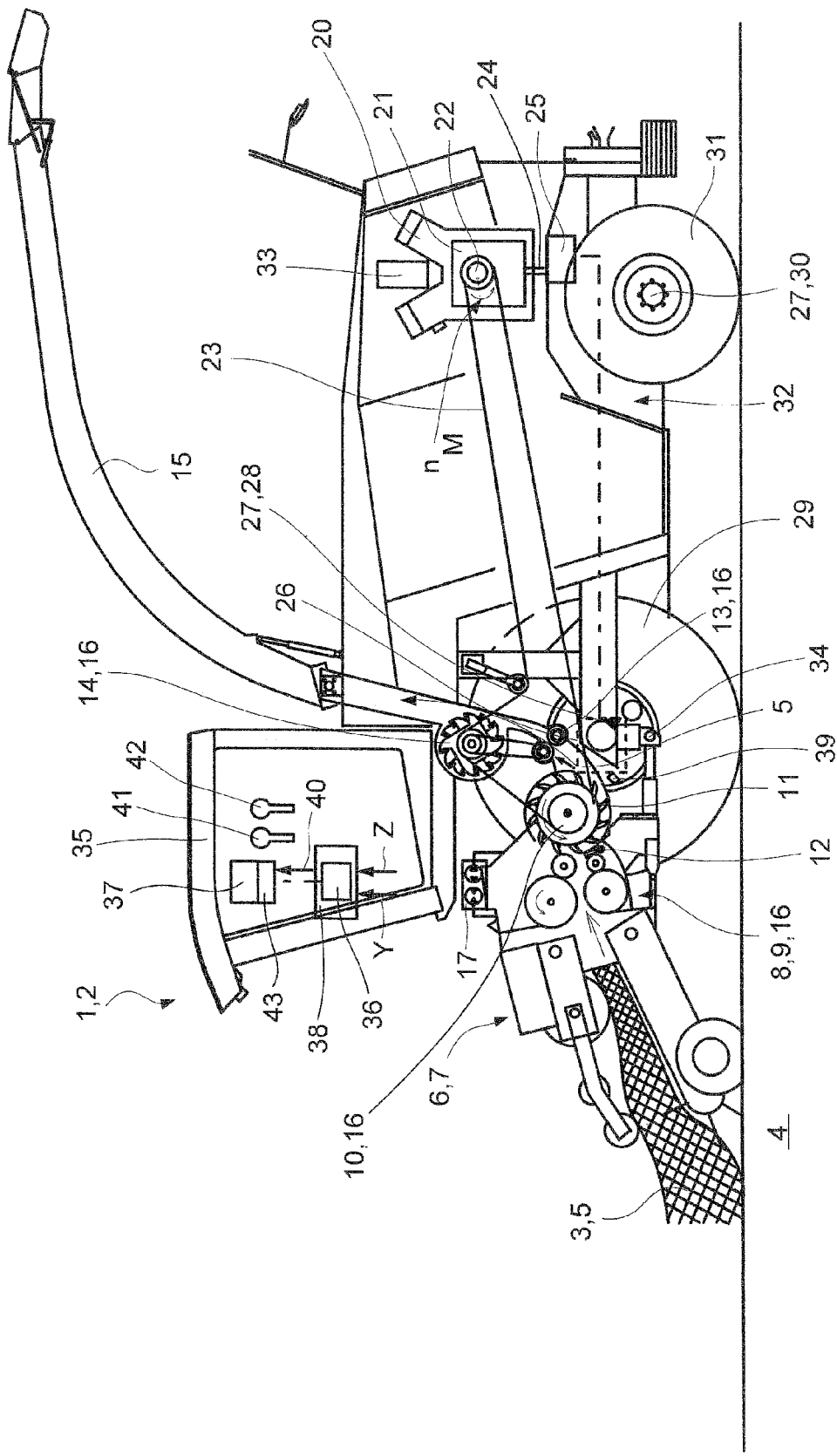
FIG. 1 shows a side view of an agricultural working machine designed as a forage harvester in accordance with the present invention.

FIG. 1 shows an agricultural working machine 1 designed as self-propelled forage harvester 2, to the front region of which a pickup 6 is assigned to pick up crop material 5 placed on ground 4 in a crop material swath 3. It is within the scope of the present invention that any type of front attachment 7 for picking up crop material 5 may be adapted in place of pickup 6 on forage harvester 2. In a manner known per se, crop material 5 may be transferred by pickup 6 to intake conveyor mechanisms 9—which are provided in pairs and are designed as intake and compression rollers 8—which compress crop material 5 and transfer it in their rear region to chopper drum 10. Rotating blades 11 of chopper drum 10—in cooperation with a stationary shear bar 12—fragmentize crop material 5 and may transfer it—in the rear region of chopper drum 10—to post-fragmentation devices 13, e.g., corn crackers. Post-fragmentation devices 13, which are typically also provided in pairs and rotate in opposite directions, transfer crop material 5 to a post-accelerator 14, which increases the kinetic energy of crop material 5 in such a manner that crop material 5 passes through an upper discharge chute 15—which is open at the top—and out of it, thereby enabling crop material 5 to be transferred to a not-shown hauling vehicle. With respect to the present invention described below, intake conveyor mechanisms 9, chopper drum 10, post-fragmentation devices 13, and post-accelerator 14 are the working units 16 of forage harvester 2.

Forage harvester 2 also includes at least one drive engine 20, which is coupled with a main transmission 21. A belt drive 23 for driving working units 16 is supplied with drive energy via a first main transmission output 22. In this context, it should be mentioned that the forage harvester may also be designed such that intake conveyor mechanisms 9 may be driven in a stepless manner. In this case, a hydromotor-hydropump unit 17 with an adjustable intake volume which is known per se and is therefore not described in greater detail—would obtain its drive energy from belt drive 23 via suitable transmission elements. A further main transmission output 24 is coupled with one or more mechanical and/or hydraulic transmission stages 25, which supply the one or more drive axles 27 of forage harvester 2 with drive energy via suitable wheel drives 26 in a manner known per se. Depending on the design of forage harvester 2, it is possible to design only front axle 28—with its associated land wheels 29—or rear axle 30—with its associated land wheels 31—or both as drive axle 27. Transmission stages 25, wheel drives 26, and drive axles 27 and not-shown mechanical and/or hydraulic transmission elements in general form ground drive 32 of agricultural working machine 1, which is designed as forage harvester 2.

An engine control unit 33 is typically preinstalled with the at least one drive engine 20 by the manufacturer. Engine control unit 33 makes it possible to regulate engine speed nM, and it may ascertain and output various parameters of drive engine 20, in a manner to be described below. In addition, ground speed $v_f$ of forage harvester 2 is determined using a speed sensor 34 assigned to land wheel 29 in a manner such that speed signal Z generated by speed sensor 34 is transferred to an arithmetic logic unit 36 located, e.g., in driver's cab. Arithmetic logic unit 36 then ascertains a ground speed $v_f$ based on the known geometric relationships of land wheel 29 and the position of speed sensor 34, and displays the ground speed in a display unit 37 coupled with arithmetic logic unit 36. It is within the scope of the present invention for arithmetic logic unit 36 to be part of a more complex control and regulating unit 38, which may simultaneously ascertain, monitor, and modify parameters of agricultural working machine 1 to be described in greater detail below, in a manner to be described in greater detail.

A throughput-measuring device 39 of the type described in DE 195 24 752—the contents of which are hereby intended to be included in this description—and which is known per se is also assigned to forage harvester 2 depicted in the exemplary embodiment. Throughput-measuring device 39 generates a crop-material throughput signal Y, which is also transferred to arithmetic logic unit 36 or a more complex control and regulating unit 38. A crop-material throughput 40 passing through forage harvester 2 is then ascertained from crop-material throughput signal Y in a manner which is known per se and is described, e.g., in DE 195 24 752. Crop-material throughput 40 is also displayable in display unit 37. At least one ground speed control lever 41 for manually changing ground speed $v_f$ of forage harvester 2 and at least one further control lever 42 for changing engine speed $n_M$ are also provided in the driver's cab. It lies within the framework of the present invention that the functions of ground speed control lever 41 and control lever 42 described may also be integrated in a single control lever, or that they may be selected and edited via an input terminal 43.

Figure 2:
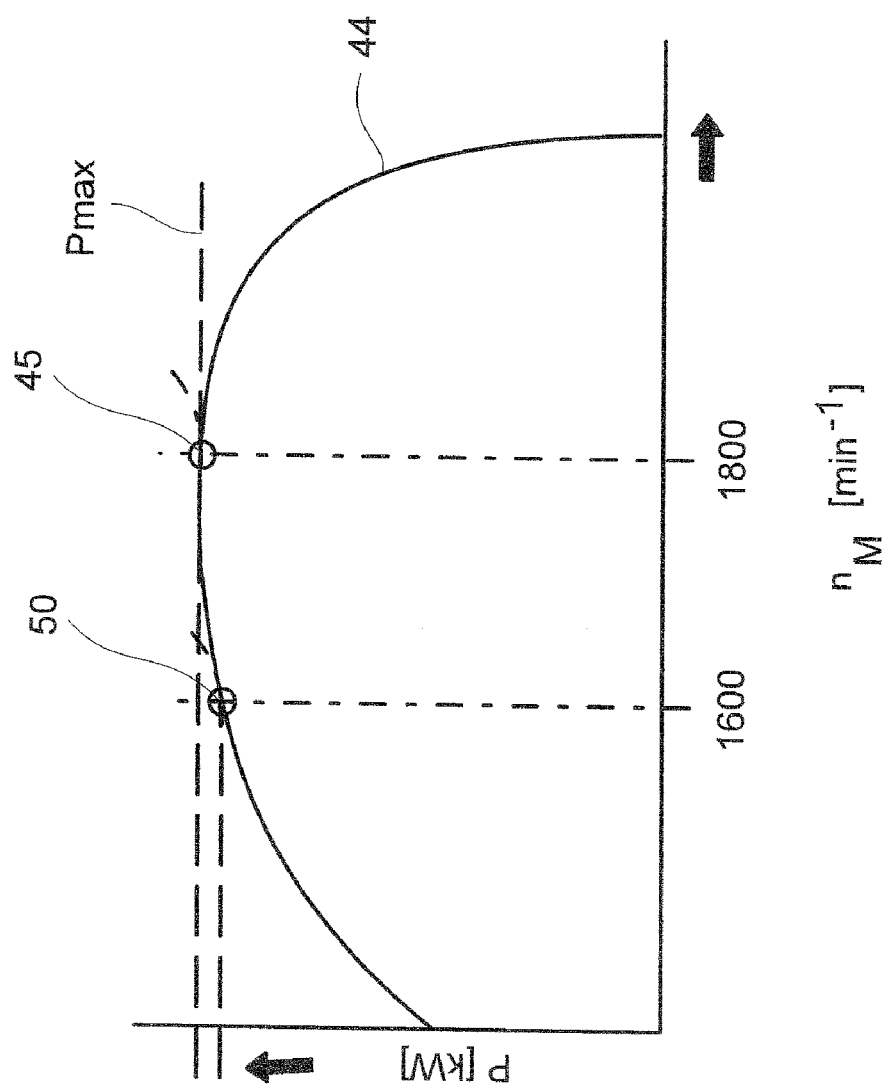
FIG. 2 shows a schematic depiction of an engine characteristic curve in accordance with the present invention.

With conventional forage harvesters 2, the typical procedure for operating forage harvester 2 is to first adjust engine speed $n_M$ at which maximum engine output $P_{max}$ is available, using control lever 42. This situation is depicted in FIG. 2 using an engine characteristic curve 44 chosen as an example. In this case, the maximum engine output of Pmax=420 kW takes place at an engine speed of $n_M$=1800 min$^{-1}$. At this full-load operating point 45, ground speed $v_f$ of forage harvester 2 at the maximum crop-material throughput that may be processed is e.g., 6 km/h. In the simplest case, i.e., without the rotational speed of chopper drum 10 being monitored with sensors, the operator regulates ground speed $v_f$ of forage harvester 2 in such a manner that an audible drop in rotational speed of chopper drum 2 is prevented. Highly diverse, sensor-based monitoring systems that automatically adapt the ground speed based on the throughput are known from the related art, however. Both methods operate according to the same principle, however, namely that ground speed $v_f$ and, therefore, crop-material throughput 40 are always reduced when the rotational speed of chopper drum 10 falls below a certain minimum value and, conversely, ground speed $v_f$ and, therefore, crop-material throughput 40 are always increased when the rotational speed of chopper drum 10 rise above a certain maximum value, or when the output required is less than the available power. Given that drive engine 20 is always operated at high engine speed $n_M$, a considerable portion of the power output is required to accelerate the crop material and overcome friction, which is proportional to speed. Operating drive engine 20 at a high engine speed $n_M$ also results in increased fuel consumption.

The inventive method and the device for carrying out this method will now be described in detail with reference to FIG. 3 and FIG. 2. As described above, agricultural working machine 1, which is designed as forage harvester 2, includes a arithmetic logic unit 36 and/or a more complex control and regulating unit 38 that contains arithmetic logic unit 36. For simplicity, the description below will refer only to control and regulating unit 38, even though the further description could also refer solely to arithmetic logic unit 36 in an analogous manner. Rotational speed signals Z generated by rotational speed sensor 34 and crop-material throughput signals Y generated by throughput-measuring device 39 are transmitted by particular sensors 34, 39 to control and regulating unit 38. Algorithms are stored in control and regulating unit 38 in a manner known per se. The algorithms ascertain ground speed $v_f$ of agricultural working machine 1 based on rotational speed signals Z and crop-material throughput signals Y, and they ascertain the crop-material throughput 40 currently being processed by agricultural working machine 1.

As described above, it is possible to visualize ground speed $v_f$ and ascertained throughput 40 in a display unit 37 for the operator of agricultural working machine 1, thereby ensuring that the operator is always informed of the current value of these parameters. In addition, control and regulating unit 38 is coupled with engine control unit 33 of the at least one drive engine 20 in such a manner that data may be exchanged. Engine control unit 33 is designed such that it transmits the following information, at the least, to control and regulating device 38: Current engine speed 46, current fuel consumption 47, engine output P that is currently available, and, analogously, engine torque M that is currently available. It is within the scope of the present invention that parameters 46, 47, P, M transmitted by engine control unit 33 may also be visualized in display unit 37. Furthermore, a rotational speed measuring device 48 may be assigned to chopper drum 10, which transmits a chopper drum rotational speed signal X to control and regulating unit 38. Chopper drum rotational speed 49 determined therefrom may also be displayed in display unit 37.

In the simplest case, the inventive method described below is controlled directly by the operator of the agricultural working machine. To this end, the operator of forage harvester 2 first selects engine speed $n_M$ at which the at least one drive engine 20 provides maximum engine output $P_{max}$, using control lever 42. In the exemplary embodiment shown, this engine operating point corresponds to full-load operating point 45 indicated in FIG. 2. Ground speed $v_f$ of agricultural working machine 1 is then increased during the harvesting operation until the operating point of the maximum crop-material throughput 40 that the forage harvester is able to manage is reached. The maximum manageable crop-material throughput 40 is typically reached when available engine output $P_{max}$ does not result in a further increase in ground speed $v_f$.

A further criterium for attaining maximum crop-material throughput 40 may also be the decrease in rotational speed of chopper drum 10, which may be read precisely on display unit 37, or which is indicated acoustically. At full-load operating point 45 shown in FIG. 2, ground speed $v_f$ at maximum manageable crop-material throughput 40 is, e.g., 6 km/h. This ground speed value may also be read by the operator in display unit 37, as described above. Given that, once maximum crop-material throughput 40 is reached, the operator of agricultural working machine 1 increases ground speed $v_f$ incrementally by operating ground speed control lever 41, engine speed $n_M$ also decreases, due to the limited mount of drive power P available from drive engine 20.

The operator of agricultural working machine 1 repeats this incremental increase in ground speed $v_f$, with the simultaneous reduction in engine speed $n_M$, until maximum crop-material throughput 40 of full-load operating point 45 determined previously is attained once more. In this manner, it is possible for agricultural working machine 1 to process maximum crop-material throughput 40, due to increased ground speed $v_f$, while simultaneously operating drive engine 20 in a partial-load region with lower fuel consumption. In the example shown in FIG. 2, this partial-load operating point 50 is located at an engine speed of $n_M$=1600 min$^{-1}$. Ground speed $v_f$ of forage harvester 2 in this partial-load operating range 50 is, e.g., 8 km/h. In this context, it has proven advantageous when engine speed $n_M$ at partial-load operating point 50 lies in a range of 10 to 15% of engine speed $n_M$ at full-load operating point 45. With regard for ground speed $v_f$, advantageous conditions exist when ground speed $v_f$ at partial-load operating point 50 is approximately 20 to 30% above ground speed $v_f$ at full-load operating point 45.

Provided that forage harvester 2 includes throughput-measuring device 39 described, the steps described above to adjust ground speed $v_f$ and engine speed $n_M$ may also be carried out directly by the operator of agricultural working machine 1, depending on crop-material throughput 40 visualized in display unit 37. In the simplest case, the adjustment steps in the inventive method are repeated until crop-material throughput 40 at partial-load operating point 50 visualized in display unit 37 is nearly the same as crop-material throughput 40 at full-load operating point 45.

Given that control and regulating unit 38 may also be coupled with ground drive control 51 assigned to ground drive 28 such that data may be exchanged, it is also possible to automatically adjust ground speed $v_f$ and engine speed $n_M$ in a manner to be described below. In this case, maximum manageable throughput 40 would also be ascertained in the manner described above, and control and regulating unit 38—depending on the equipment installed on forage harvester 2—ascertains, stores, and displays the following information in display unit 37: Engine speed $n_M$ of drive engine 20 and ground speed $v_f$ of forage harvester 2, and, possibly, maximum crop-material throughput 40. In a subsequent step, the control and regulating unit generates a ground speed signal V to increase ground speed $v_f$, and an engine speed signal W to reduce engine speed $n_M$. These steps are repeated until maximum crop-material throughput 40 determined previously is reached once more.

Given that the reduction in engine speed $n_M$ results in a reduction of the rotational speeds of various working units 16 on forage harvester 2, the intake conveyor speed of intake and compression rollers 8 reduces, and crop-material throughput 40 would also decrease. Given that ground speed $v_f$ is increased, however, forage harvester 2 now picks up more crop material 5 in a defined time interval. As a result, the crop-material throughput-reducing effect of a lower engine speed $n_M$ may be compensated for by higher ground speed $v_f$. Since the mathematical relationships between ground speed $v_f$, the rotational speed of the intake conveyor mechanisms and crop-material throughput are known, characteristic curves 52 may now be stored in control and regulating unit 38, which define the ground speeds $v_f$ and engine speeds $n_M$ required to attain constant crop-material throughput 40. Characteristic curves 52 of this type have the advantage, in particular, that they eliminate the need for a throughput-measuring device 39.

A particularly efficient implementation of the inventive method results when the method is used, in particular, with crop material 5 with high mass and/or density, or with large particles. The former is the case, e.g., when very moist crop material 5 is harvested, and crop material 5 is fragmentized to a very great extent (short cut length) on chopper drum 10. Due to the high portion of water and the good layering of short crop material particles, crop material 5 of this type has a high density, which ultimately means that large masses must be accelerated, and the acceleration energy required decreases as the speed at which crop material 5 with this structure may be conveyed through forage harvester 2 decreases. In contrast, large particles result when the cut lengths are long. The large particles require less energy for fragmentizing the crop material. The ratio of energy required for fragmentizing to the portion of energy required for acceleration and rasping worsens, thereby resulting in an increase in the specific energy requirement and, therefore, fuel consumption, if drive engine 20 were continued to be operated in the range of high engine speeds $n_M$.

Figure 3:
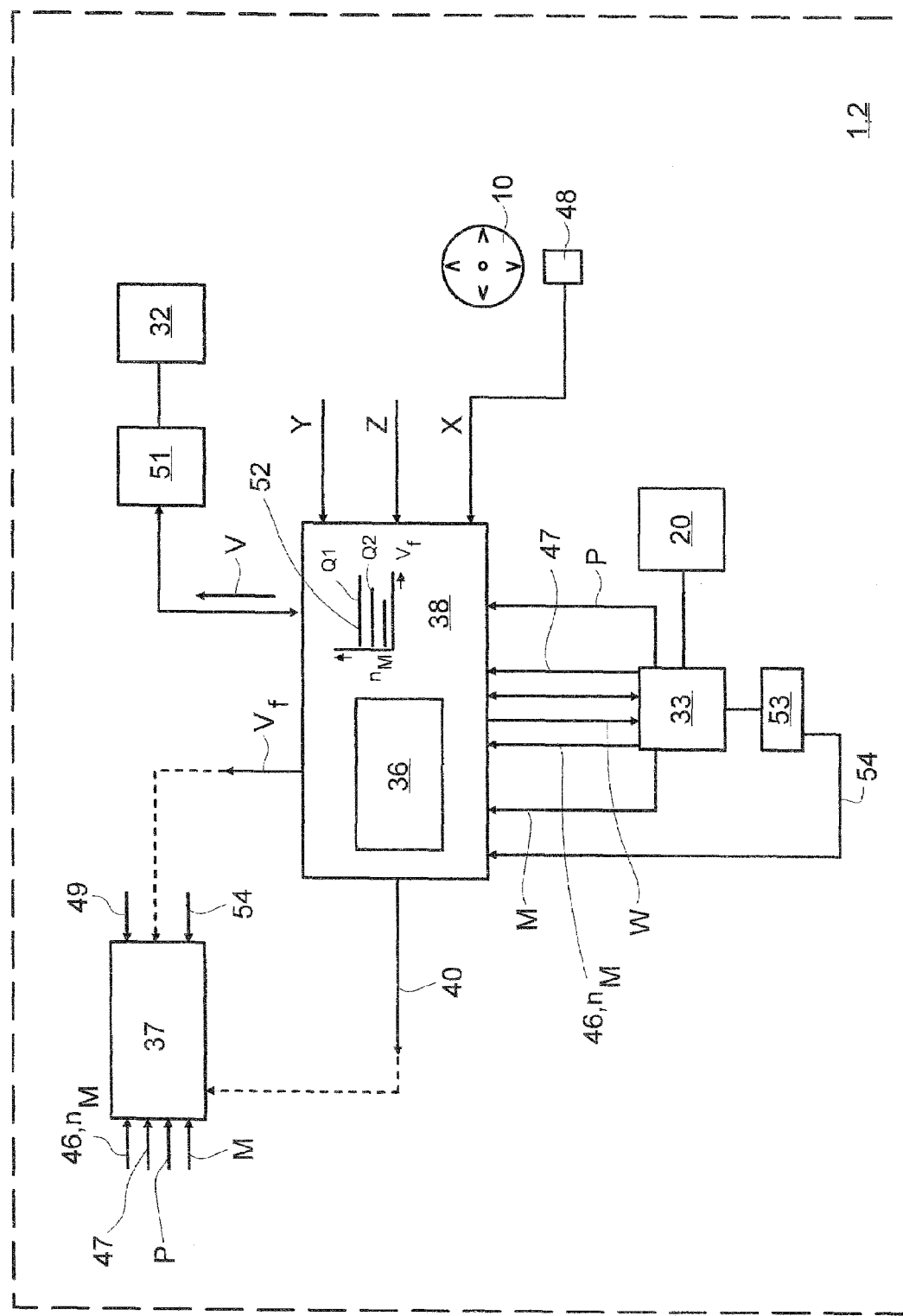
FIG. 3 shows a schematic depiction of the inventive method and the agricultural working machine used to implement the method in accordance with the present invention.

In a further advantageous embodiment of the present invention, forage harvester 2 also includes a fuel consumption indicator 53, which may be installed directly in engine control unit 33, e.g., as shown in FIG. 3. The inventive method and the associated device may therefore take fuel consumption into account directly. This may take place, e.g., by transmitting current fuel consumption 54 that is ascertained to control and regulating unit 38 and, possibly, from this to display unit 37 for visualization. As a result, either the operator of agricultural working machine 1 or control and regulating unit 38 may determine—when engine speed $n_M$ is reduced and ground speed $v_f$ is increased—a partial-load operating point 50 that ensures the most optimal fuel consumption when maximum crop-material throughput 40 is being handled.

It will be understood that each of the elements described above, or two or more together, may also find a useful application in other types of methods and constructions differing from the type described above.

While the invention has been illustrated and described as embodied in an agricultural working machine, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An agricultural working machine, comprising
   at least one device for picking up crop material and transferring the crop material;
   at least one intake conveyor mechanism to which the picked up crop material is transferred by the at least one device and which feeds the crop material;
   at least one downstream working unit to which the crop material is fed and which processes the crop material;
   at least one drive engine with an engine control unit, which said at least one drive engine drives said at least one intake conveyor mechanism and said at least one working unit;
   a control and regulating unit for controlling and regulating the engine speed and ground speed so that the agricultural working machine picks up, conveys and processes crop material at a maximum crop throughput by reducing the engine speed and simultaneously increasing the ground speed until the maximum crop material throughput is reached at a drive engine load operating point that is partially below a drive engine full-load operating point.

2. An agricultural working machine as defined in claim 1, wherein said control and regulating unit includes control levers for adjusting the ground speed and engine speed of said at least one drive engine, said control levers being actuatable by an operator of the agricultural working machine.

3. An agricultural working machine as defined in claim 1; and further comprising means for sensing a parameter selected from the group consisting of a crop-material throughput, a fuel consumption, and both; and wherein the one control and regulating unit regulates the engine speed of said at least one drive engine and the ground speed of the agricultural working machine as a function of the sensed parameter.

4. An agricultural working machine as defined in claim 3, wherein said control and regulating unit is coupled with said engine control unit of said at least one drive engine and a control of a ground drive such that data are exchangeable.

5. An agricultural working machine as defined in claim 1, wherein the agricultural machine is a forage harvester.

6. An agricultural working machine as defined in claim 1, further comprising at least one engine speed measuring device measuring the speed of said at least one drive engine.

7. An agricultural working machine as defined in claim 1, further comprising at least one engine speed display device displaying the speed of said at least one drive engine.

8. An agricultural working machine as defined in claim 1, further comprising a ground speed measuring device measuring the ground speed of the agricultural working machine.

9. An agricultural working machine as defined in claim 1, further comprising a ground speed display unit displaying the ground speed of the agricultural working machine.

10. An agricultural working machine as defined in claim 1, further comprising at least one engine speed measuring device measuring the speed of said at least one drive engine, at least one engine speed display device displaying the speed of said at least one drive engine, a ground speed measuring device measuring the ground speed of the agricultural working machine, and a ground speed display unit displaying the ground speed of the agricultural working machine.

11. An agricultural working machine as defined in claim 1, wherein the drive engine partial-load operating point is 10-15% below the drive engine full-load operating point.

12. An agricultural working machine as defined in claim 1, wherein the drive engine partial-load operating point results in lower specific energy requirements.

13. An agricultural working machine as defined in claim 1, wherein the ground speed at the drive engine partial-load operating point is 20-30% above the ground speed at the drive engine full-load operating point.

14. A method of operating an agricultural working machine, comprising the steps of picking up crop material and transferring said crop material by at least one device to at least one intake conveyor mechanism; feeding by the at least one intake conveyor mechanism the crop material to at least one downstream working unit that processes the crop material; driving the at least one conveyor mechanism and the at least one working unit by at least one drive engine with an engine control unit; and controlling and regulating the engine speed and ground speed by a control and regulating unit so that the agricultural working machine picks up, conveys and processes crop material at a maximum crop throughput by reducing the engine speed and simultaneously increasing the ground speed until the maximum crop material throughput is reached at a drive engine load operating point that is partially below a drive engine full-load operating point.

15. A method as defined in claim 14, further comprising adjusting the ground speed and the engine speed of said at least one drive engine by control levers provided in said control and regulating unit and actuatable by an operator of the agricultural working machine.

16. A method as defined in claim 14, further comprising sensing a parameter selected from the group consisting of a crop-material throughput, a fuel consumption, and both, and regulating by the control and regulating unit the engine speed of said at least one drive engine and the ground speed of the agricultural working machine as a function of the sensed parameter.

17. A method as defined in claim 16, further comprising coupling said control and regulating unit with said engine control unit of said at least one drive engine and a control of a ground drive such that data are exchangeable.

18. A method as defined in claim 14, further comprising using the method in the agricultural working machine which is a forage harvester.

19. A method as defined in claim 14, further comprising measuring the speed of said at least one drive engine by at least one drive engine speed measuring device.

20. A method as defined in claim 14, further comprising displaying the speed of said at least one drive engine by at least one engine speed display device.

21. A method as defined in claim 14, further comprising measuring the ground speed of the agricultural working machine by a ground speed measuring device.

22. A method as defined in claim 14, further comprising displaying the ground speed of the agricultural working machine by a ground speed display unit.

23. A method as defined in claim 14, further comprising measuring the speed of said at least one drive engine by at least one drive engine speed measuring device, displaying the speed of said at least one drive engine by at least one engine speed display device, measuring the ground speed of the agricultural working machine by a ground speed measuring device, and displaying the ground speed of the agricultural working machine by a ground speed display unit.

24. A method as defined in claim 14, further comprising providing the drive engine partial-load operating point to be 10-15% below the drive engine full-load operating point.

25. A method as defined in claim 14, further comprising obtaining a lower specific energy requirements due to the drive engine partial-load operating point.

26. A method defined in claim 14, further comprising using the ground speed at the drive engine partial-load operating point to be 20-30% above the ground speed at the drive engine full-load operating point.

* * * * *